US010129254B2

(12) United States Patent
Kalan et al.

(10) Patent No.: US 10,129,254 B2
(45) Date of Patent: *Nov. 13, 2018

(54) AUTOMATED PROVISIONING OF A NETWORK APPLIANCE

(71) Applicant: ZixCorp Systems, Inc., Dallas, TX (US)

(72) Inventors: John Kalan, Dallas, TX (US); Charles A. Rego, Dallas, TX (US)

(73) Assignee: ZixCorp Systems, Inc., Dallas, TX (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/170,074

(22) Filed: Jun. 1, 2016

(65) Prior Publication Data

US 2016/0277403 A1    Sep. 22, 2016

Related U.S. Application Data

(63) Continuation of application No. 12/841,822, filed on Jul. 22, 2010, now Pat. No. 9,363,088.

(51) Int. Cl.
H04L 29/06 (2006.01)
H04L 9/32 (2006.01)
(52) U.S. Cl.
CPC .......... H04L 63/0876 (2013.01); H04L 9/321 (2013.01); H04L 9/3263 (2013.01); H04L 63/045 (2013.01); H04L 63/0428 (2013.01); H04L 63/061 (2013.01); H04L 63/0823 (2013.01)
(58) Field of Classification Search
CPC . H04L 9/3263; H04L 63/0876; H04L 9/0861; G06F 21/33

USPC ........................................................ 713/156
See application file for complete search history.

(56) References Cited

U.S. PATENT DOCUMENTS

| 6,675,153 | B1 | 1/2004 | Cook |
| 6,687,687 | B1 | 2/2004 | Smadja |
| 6,732,101 | B1 | 5/2004 | Cook |
| 6,760,752 | B1 | 7/2004 | Liu |
| 6,795,920 | B1 | 9/2004 | Bacha |

(Continued)

OTHER PUBLICATIONS

Marcon et al, Policy Control Management for Web Services, 2009, IEEE, pp. 49-56.*

(Continued)

Primary Examiner — Luu T Pham
Assistant Examiner — Jenise Jackson
(74) Attorney, Agent, or Firm — Baker Botts L.L.P.

(57) ABSTRACT

Certain embodiments disclose a method of provisioning security services for a domain or set of domains. The method comprises sending an electronic message to the domain or set of domains. The electronic message comprising a secret message. The secret message is encrypted using a public key that a certificate server associates with the domain or set of domains. The method further comprises receiving a response from the domain or set of domains. The response comprises data derived by decrypting the secret message using a private key of the domain or set of domains. In response to a determination that the received data corresponds to the secret message sent in the electronic message, the method initiates the provisioning of the security services for the domain or set of domains.

18 Claims, 5 Drawing Sheets

(56) References Cited

U.S. PATENT DOCUMENTS

| | | | |
|---|---|---|---|
| 7,136,841 | B2 | 11/2006 | Cook |
| 7,263,619 | B1 | 8/2007 | Kim |
| 7,353,204 | B2 | 4/2008 | Liu |
| 7,475,256 | B2 | 1/2009 | Cook |
| 7,493,661 | B2 | 2/2009 | Liu |
| 7,539,725 | B2 | 5/2009 | Nutkis |
| 7,574,607 | B1 | 8/2009 | Liu |
| 8,095,606 | B1 | 1/2012 | Wiley |
| 2002/0023213 | A1* | 2/2002 | Walker ............... H04L 63/0442 713/168 |
| 2003/0023849 | A1 | 1/2003 | Martin |
| 2004/0025057 | A1 | 2/2004 | Cook |
| 2004/0249817 | A1 | 12/2004 | Liu |
| 2005/0071508 | A1* | 3/2005 | Brown .................... H04L 51/38 709/246 |
| 2005/0131826 | A1 | 6/2005 | Cook |
| 2005/0198508 | A1 | 9/2005 | Beck |
| 2006/0129629 | A1* | 6/2006 | Kawashima ......... G06Q 10/107 709/203 |
| 2007/0011253 | A1* | 1/2007 | Taylor .................... H04L 51/12 709/206 |
| 2007/0083749 | A1* | 4/2007 | Fang .................. H04L 63/0442 713/152 |
| 2007/0266249 | A1* | 11/2007 | Kinser .................. H04L 63/062 713/173 |
| 2008/0005786 | A1 | 1/2008 | Dreymann |
| 2008/0072294 | A1 | 3/2008 | Chatterjee |
| 2008/0162933 | A1 | 7/2008 | Okada |
| 2008/0189372 | A1 | 8/2008 | Solberg |
| 2008/0228651 | A1* | 9/2008 | Tapsell ................. G06Q 20/045 705/65 |
| 2008/0273706 | A1 | 11/2008 | Noll |
| 2009/0006564 | A1 | 1/2009 | Kay |
| 2009/0070858 | A1* | 3/2009 | Hiraide ................... G06F 21/42 726/4 |
| 2009/0080635 | A1 | 3/2009 | Altberg |
| 2009/0150675 | A1 | 6/2009 | Cook |
| 2009/0158038 | A1 | 6/2009 | Ng |
| 2009/0193093 | A1* | 7/2009 | Atkinson ............. G06Q 10/107 709/206 |
| 2009/0198997 | A1* | 8/2009 | Yeap ................... H04L 63/0823 713/155 |
| 2009/0228461 | A1 | 9/2009 | Nutkis |
| 2010/0229051 | A1* | 9/2010 | Vargas ..................... H04L 9/30 714/57 |
| 2010/0281257 | A1* | 11/2010 | Yamazaki ........... H04L 63/0209 713/168 |
| 2011/0066643 | A1 | 3/2011 | Cooper |
| 2011/0219081 | A1 | 9/2011 | Parthasarathy |
| 2012/0185918 | A1* | 7/2012 | Backholm ............ G06Q 10/107 726/3 |
| 2012/0331080 | A1* | 12/2012 | Sidman ............. H04L 29/12386 709/206 |
| 2013/0212637 | A1* | 8/2013 | Guccione .............. H04L 63/102 726/1 |
| 2015/0089229 | A1* | 3/2015 | Zager ..................... G06Q 20/04 713/170 |
| 2017/0214649 | A1* | 7/2017 | Tomkow ................. H04L 51/34 |

OTHER PUBLICATIONS

Goldman et al, Analysis of the Periodical Payment Framework using Restricted Proxy Certificates, 2010, ACM, pp. 143-152.*

European Patent Office; Extended European Search Report and Written Opinion issued for related EP Application No. EP 16186443. 4, dated Nov. 24, 2016.

Telephony Probability of a SIP call, 2009, IEEE, pp. 254-259.

Cherry Internet Name Game Gets Serious, Jun. 2001, IEEE, p. 83.

Symantec Brightmail Gateway Webpage; Retrieved from the internet Jun. 8, 2010; Downloaded at http://www.symantec.com/business/brightmail-gateway.

Chapter 13: Key Management Techniques ED—Menezes A J; Van Oorschot P C; Vanstone S A; Handbook of Applied Cryptography; [CRC Press Series on Discrete Mathematices and Its Applications], CRC Press Series on Discrete Mathematics and Its Applications, Boca Raton, FL, US, pp. 543-590, Oct. 1, 1996, XP001525013; Retrieved from the Internet: URL: http://www.cacr.math.uwaterloo.ca/hac/.

"Chapter 10; Identification and Entity Authentication ED—Menezes A J; Van Oorschot P C; Vanstone S A", Handbook of Applied Cryptography; [CRC Press Series on Discrete Mathematices and Its Applications], CRC Press Series on Discrete Mathematics and Its Applications, Boca Raton, FL, US, pp. 385-424; Oct. 1, 1996, XP001525010; Retrieved from the Internet: URL: http//www.cacr.math.uwaterloo.ca/hac/.

Lars Eilebrecht ED—Andrew S Patrick et al.: "Ciphire Mail Email Encryption and Authentication", Aug. 2, 2005; Financial Cryptography and Data Security: 9$^{th}$ International Conference, FC 2005, Roseau, The Commonwealth of Dominica, Feb. 28, 2005; Springer-Verlag, Berlin/Heidelberg, pp. 211-224, XP019011807.

International Search Report and Written Opinion from International Application PCT/US2011/043276, received Nov. 17, 2011.

* cited by examiner

AUTOMATED PROVISIONING OF A NETWORK APPLIANCE

RELATED APPLICATIONS

This application is a continuation of U.S. patent application Ser. No. 12/841,822 filed Jul. 22, 2010 and entitled "Automated Provisioning of a Network Appliance," which is incorporated herein by reference.

FIELD

The present invention relates to securely delivering electronic messages over a network, including apparatuses, systems, methods, computer readable media and other means for provisioning an appliance to facilitate secured delivery of electronic messages.

BACKGROUND

Millions of emails are sent every day. While some emails may be suitable or even intended for public dissemination, many emails are not. People often email personal, private, financial, business-sensitive and other non-public information.

Despite the private nature of these emails, many are sent over public networks without any security precautions. As a result, people assume the risk that their private information may become public.

There are encryption systems and methods available, but the encryption system and methods are sometimes not employed or could be improved upon due to their various limitations and drawbacks. For example, various messaging systems, such as email messaging systems, often rely on a number of publicly available or unsecured devices to facilitate the transmission of email messages over the Internet. Among other things, a relay server, such as a Symantec Brightmail® Gateway appliance, can be configured to provide outbound email security, inbound email security, including email encryption/decryption, anti-spam protection, and anti-virus protection. However, before at least some types of servers and other devices can provide some or all of these services, the devices often have to be initially provisioned to do so. Unfortunately, the initial provisioning of such devices often requires human intervention and manual efforts.

BRIEF SUMMARY

Embodiments discussed herein include apparatuses, systems, methods, computer readable media and other means for automated provisioning of an appliance to provide security services, such as encryption services for email and other types of electronic messaging systems. For example, a certificate server can be configured to determine, absent direct human involvement, whether a server and/or other appliance are authorized to deliver email messages for one or more particular email domains. In response to verifying such authority is vested with the appliance, the certificate server can be configured to provision the appliance to provide security services. For example, the certificate server can cause the appliance to be configured to encrypt at least some outgoing email messages and decrypt at least some incoming email messages. After provisioning the appliance and, while the user may (or may not) be able to control whether the appliance encrypts or decrypts certain email messages, the encrypting and decrypting performed by the appliance, if enabled, can be conducted without direct user involvement.

In some embodiments, the provisioning process can be initiated by a user device configured to request that the certificate server provision one or more appliances associated with an email domain accessed by the user device. For example, the user device and/or other device can generate a public key and a private key. The private key may be sent to the appliance. In response to confirming the private key was provided to the appliance, the public key and targeted domain name (e.g., the domain name for which security services are desired) may then be provided to the certificate server. The certificate server may be configured to generate an email message that includes an encrypted token or other type of encrypted code, sometimes referred to herein as the "secret message." Before encrypting the code, the certificate server can input the code into a hash function and the outputted hash value may be saved to a database that is accessible by the certificate server.

In some embodiments, the user device may be configured to generate a certificate used to provision an appliance, and send it to the certificate server. The certificate may include, for example, the public key and/or domain name to be provisioned. As an alternative or in addition to receiving the certificate from a user device, the certificate server can be configured to generate at least part of the certificate. Regardless of which device(s) generate(s) the certificate, the certificate server can be configured to store the certificate, activate the certificate, and/or distribute the certificate to various appliances.

The certificate server may also be configured to generate a random email address at the targeted domain name. The random email address can include, for example, a random set of symbols and a nonrandom prefix or other type of symbol(s). The random set of symbols can aid in avoiding an unauthorized party from causing emails to be encrypted that the party is not authorized to control. The nonrandom symbol(s) and their respective position(s) in the email address can enable a preconfigured appliance to determine that an incoming email message is directed to a nonexistent, randomly-generated destination email address and is associated with a secret message the appliance should attempt to decrypt.

The appliance can then be configured to use the private key provided by the user device to decrypt the secret message. The decrypted secret message or other set of symbols outputted by the appliance can then be sent to the certificate server. In response to determining the decrypted secret message matches or is substantially the same as the secret message and/or data derived therefrom (such as a hash value derived from the secret message), which the certificate server initially encrypted using the public key, the certificate server can be configured to verify that the appliance has the authority to provide security services for the targeted email domain. The certificate server may then be configured to provision the appliance to provide security services. Once activated, the appliance can provide the security services.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 3:
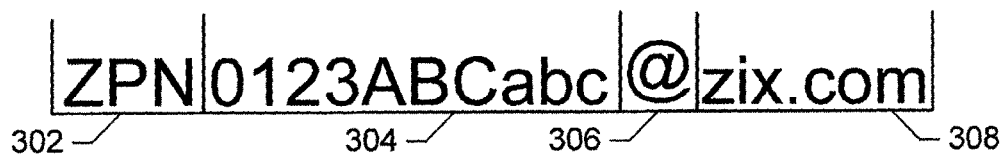
Figure 4A:
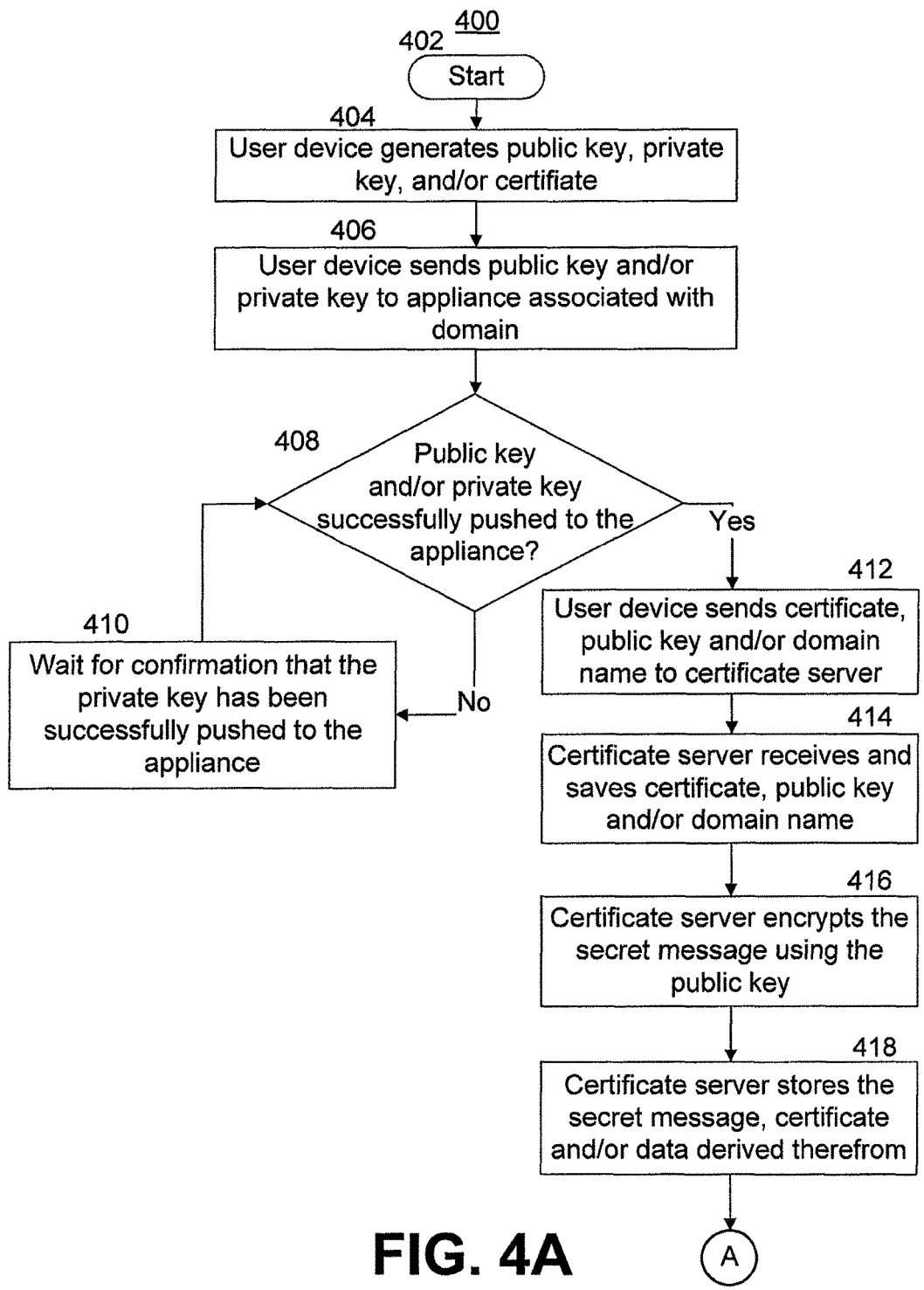
Figure 4B:
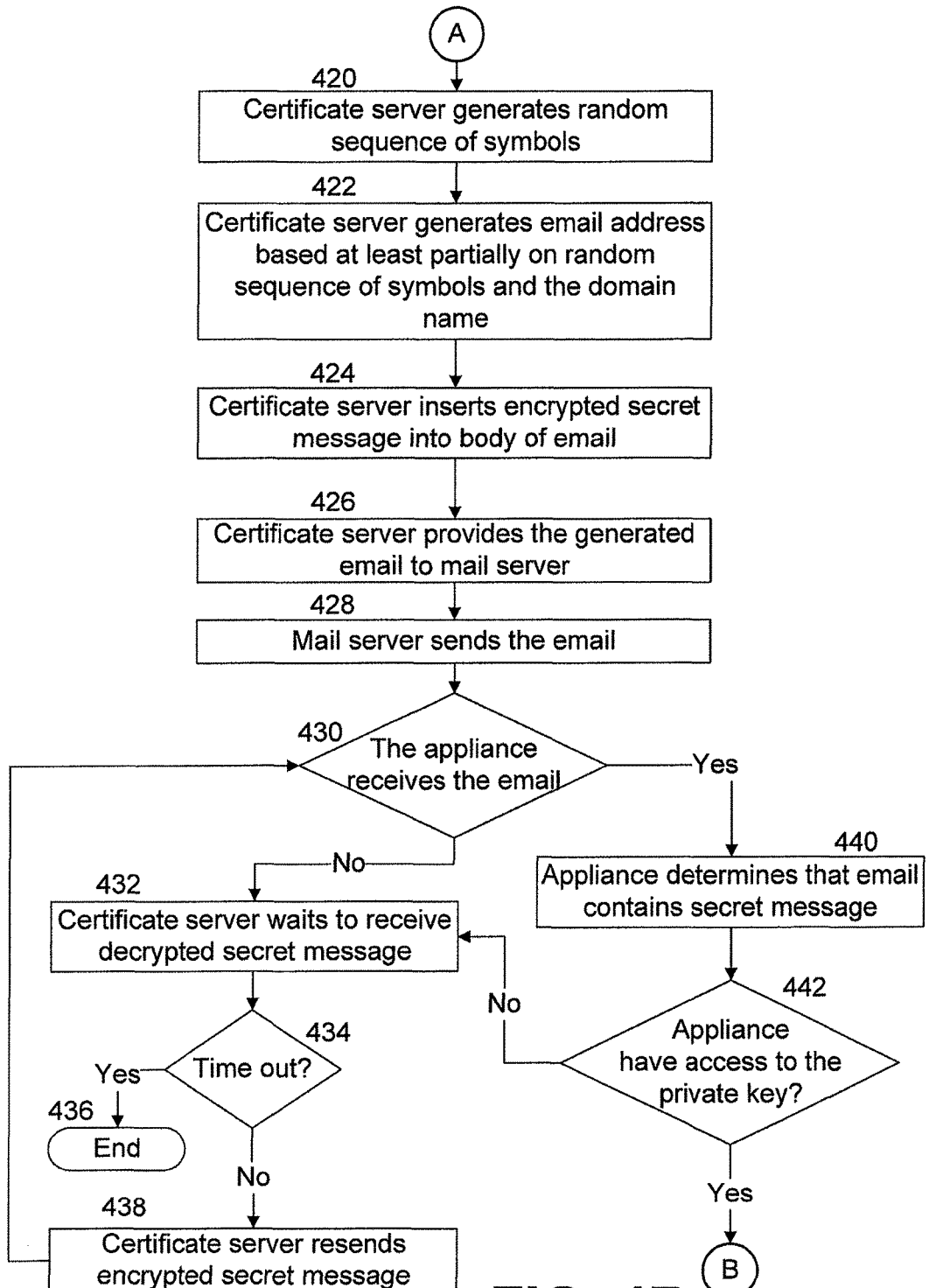
Figure 4C:
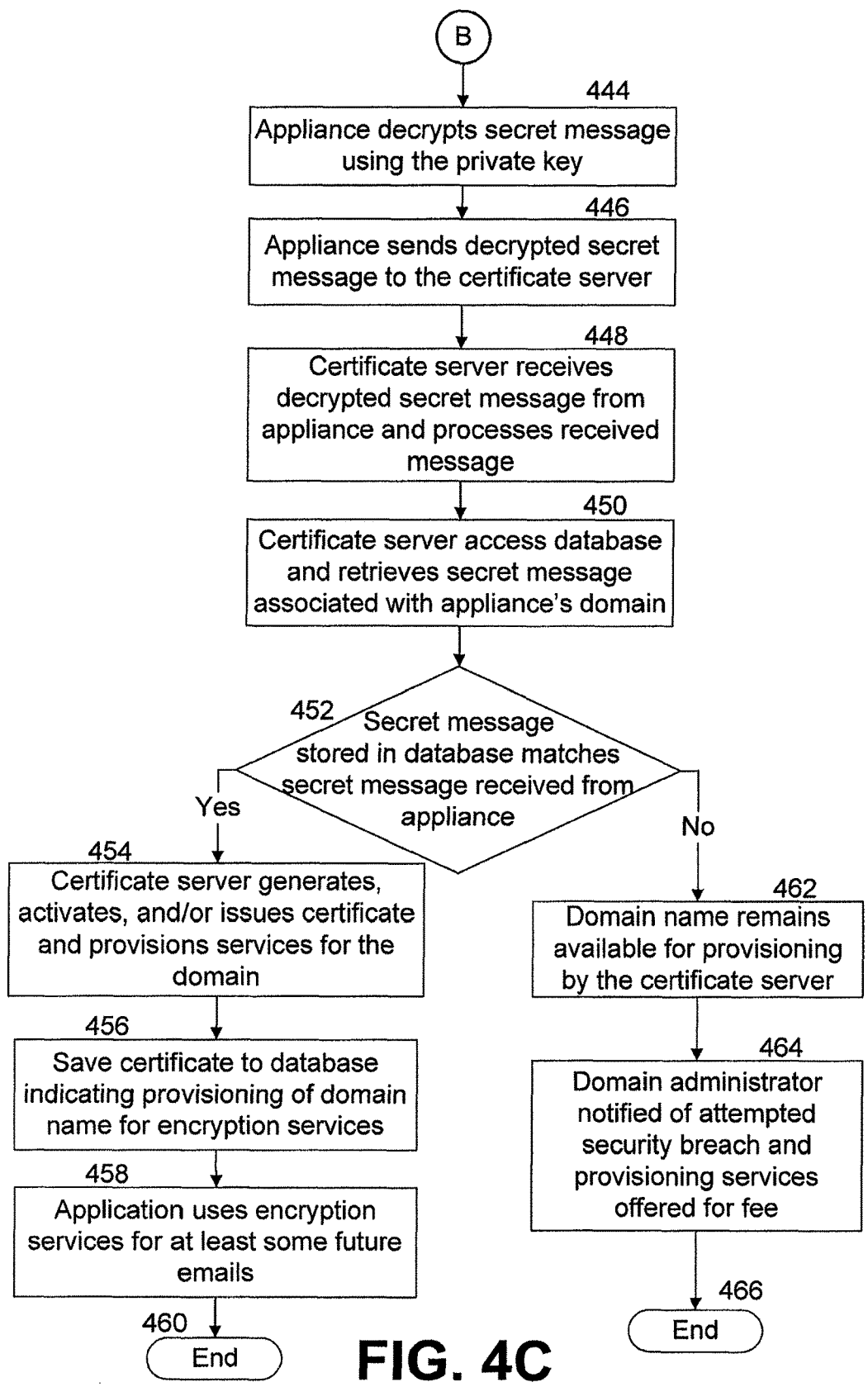

FIG. 3 shows an exemplary random email address and exemplary nonrandom formatting of the random email address in accordance with some embodiments; and FIGS. 4A-C shows a block diagram according to an exemplary method including those related to verifying an appliance is authorized to facilitate the transmission of email messages associated with a particular email domain and provisioning the appliance to provide email encryption services in accordance with some embodiments.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many electronic messages are transmitted using public or otherwise unsecured network devices. As referenced herein, "electronic messages" include, for example, email messages, short message service ("SMS") messages, voice over internet protocol ("VoIP") messages, FaceTime® messages (which includes messages sent compliant with a plurality of protocols and standards, such as the 11.264 standard, the advanced audio coding ("AAC") standard, session initiation protocol ("SIP"), real-time transport protocol ("RTP"), secure RTP ("SRTP"), among others), instant messaging ("IM") messages, mobile instant messaging ("MIM") messages, and/or any other form of electronic messages. Because electronic messages are often transmitted using unsecured network devices, the contents of unencrypted electronic messages are at risk of being compromised by interlopers while traveling between a sending device and a destination device. While many of the principles discussed herein may be applied to various types of electronic messages, many of the examples discussed herein relate to securing one type of electronic message, namely email messages, by authenticating one or more appliances that facilitate the delivery of email messages for one or more particular email domains. The authentication process can occur before provisioning each appliance to perform one or more types of electronic security services for a particular email domain.

Figure 1:
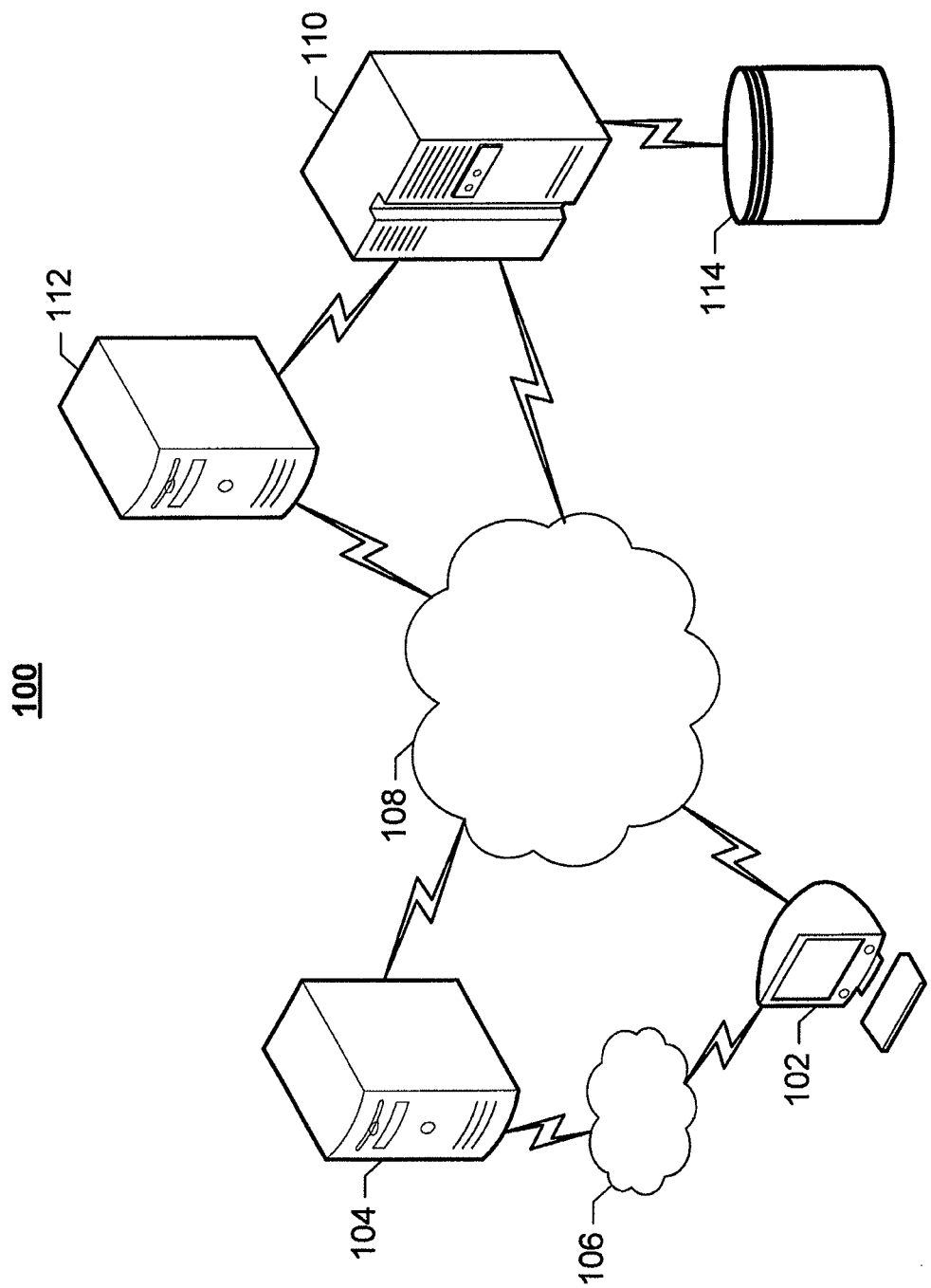
FIG. 1 is a system diagram of apparatuses that can verify whether an appliance of the system is authorized to facilitate delivery of email messages addressed to one or more particular email domains in accordance with some embodiments.

In accordance with some embodiments, FIG. 1 shows system 100, which includes user device 102 and appliance 104, which can be communicatively connected using network 106. User device 102 can be, for example, a personal computer that includes a processing unit, one or more non-transitory storage media (e.g., read only memory, random access memory, etc.), and a communications interface (e.g., circuitry to enable wireless, wired, optical, and/or any other type of communications). User device 102 may also include one or more user interfaces, which in the present example include a display screen and a keyboard. Software, firmware and/or other types of executable code may be stored by user device 102.

User device 102 may also include software, firmware and/or other forms of executable code that can enable the corresponding hardware to perform the respective functions of the user devices discussed below. For example, user device 102 may store and run executable instructions that enables user device 102 to generate, send and receive emails (locally and/or using web-based applications), generate public/private key pairs, generate certificates, access and download network content, conduct VoIP communications, send and/or receive SMS messages, conduct FaceTime® communications, among other things. Although user device 102 is shown in FIG. 1 as being a personal computer, user device 102 can be any type of network device or combination of devices, including one or more wireless telephones, personal digital assistants, laptop computers, tablet computers, among others, that the user may use to, e.g., send and receive email messages.

Appliance 104 can include one or more servers that facilitate the transmission and delivery of email messages to and/or from user device 102. For example, appliance 104 can be a relay server, such as a Symantec Brightmail® Gateway appliance. In addition to facilitating the transmission of email messages, appliance 104 can be configured to provide outbound and/or inbound email security, including email encryption/decryption, anti-spam and/or anti-virus protection, filter email messages based on email address content (and/or other information) and/or detect/prevent data loss during transmission.

In some embodiments, network 106 is a secured intranet or other communications path that enables user device 102 to privately communicate with appliance 104. Additionally or alternatively, network 106 can include at least one of the Internet, a cellular network, a direct connection, any other type of network or communications connection, or a combination thereof.

User device 102 and/or appliance 104 can also be configured to communicate with network 108. Network 108 is shown in FIG. 1 as being a public network, such as the Internet, but also or alternatively include any other type of network, such as those discussed above. Network 108 can include one or more network devices, such as domain name system ("DNS") resources, that facilitate the transmission of emails across public networks. For example, network 108 can include infrastructure that associates domain names with networking equipment for the purpose of addressing these devices worldwide by translating human-readable domain names (e.g., zix.com) to a corresponding internet protocol ("IF") address. A user, for example, can enter a uniform resource locator ("URL") into a web browser running on user device 102, and user device 102 can be configured to communicate with network 108 and download content associated with the URL. As another example, user device 102 can be configured to download and upload data related to public keys, private keys, certificates, and other information over network 108 without utilizing appliance 104.

In some embodiments, user device 102 can be configured to utilize services performed by appliance 104 before accessing network 108. For example, appliance 104 may be configured to encrypt and/or decrypt emails being sent and/or received by user device 102. In some embodiments, appliance 104 may only provide security services to emails associated with one or more particular email domains. To enable appliance 108 to receive inbound and/or outbound email messages for one or more specific domains, a DNS resource can associate appliance 108 as a mail server that accepts email for the one or more specific domains. For example, a directory and/or other mapping approach may be used to associate one or more server IP addresses with one or more domain names.

Certificate server 110 and email server 112 may also be connected to network 108. Certificate server 110 can be configured to, among other things, verify whether an appliance, such as appliance 104, is authorized to distribute, encrypt/decrypt, and/or perform any other function related to email messages addressed to or from accounts of one or more particular email domains. Examples of procedures and functional steps, which certificate server 110 can be configured to execute to verify the authority of an appliance to provide services for one or more particular email domains, are discussed in connection with FIGS. 4A-4C. Certificate server 110 can include hardware, such as one or more processing units, non-transitory storage media, and/or communications circuitry. Additional examples of hardware that may be included in certificate server 110, and exemplary interconnections of the hardware, are discussed in connection with FIG. 2.

In some embodiments, certificate server 110 can have access to one or more external storage devices, such as that included in database 114. Database 114 may be configured to, for example, store, upload and receive data from only certificate server 110. In other embodiments, database 114 may be configured to, e.g., store, upload and receive data from certificate server 110 as well as one or more other devices.

To facilitate the sending and/or receiving of email messages, email server 112 can, for example, be configured to implement the simple mail transfer protocol ("SMTP"), the post office protocol ("POP"), the internet message access protocol ("IMAP"), and/or any other suitable protocol. For example, certificate server 110 may use email server 112 to send emails to appliance 104, user device 102, and/or any other properly configured network device (not shown). Email server 112, although shown in FIG. 1 as being a separate network device, can be incorporated into certificate server 110 in some embodiments (not shown).

Figure 2:
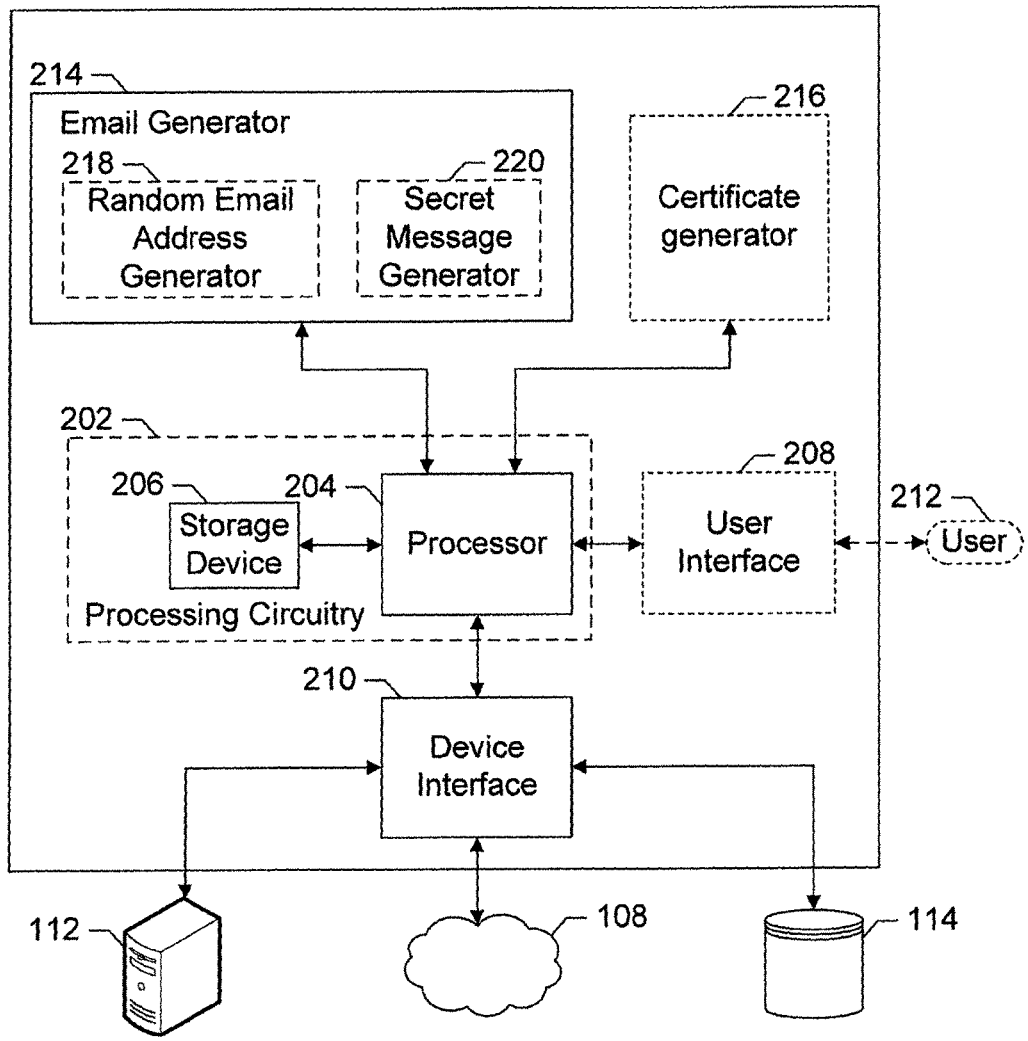
FIG. 2 is a block diagram showing various circuitry and/or other components that may be included in an apparatus configured to verify an appliance is authorized to facilitate the transmission of email messages associated with a particular email domain as well as configured to provision the appliance in accordance with some embodiments.

FIG. 2 shows circuitry and other components in accordance with some embodiments. The circuitry and other components may be included in an apparatus, such as certificate server 110. The elements of certificate server 110 can be used to verify that an appliance is authorized to support emailing functions for a particular domain and provision the appliance to provide security services for email messages associated with the domain. Although the apparatus shown in FIG. 2 is discussed in connection with certificate server 110, a variety of other devices (such as, for example, email server 112, appliance 104, user device 102, other network device, server, proxy, or the like) may include some or all of the circuitry and other components discussed in connection with FIG. 2. Alternatively, the circuitry and other components discussed in connection with FIG. 2 may be employed within a combination of devices or other types of apparatuses. For example, certificate generator 216 (discussed below) may be implemented by and/or with a processor of user device 102. Accordingly, some embodiments of the present invention may be embodied wholly at a single device (e.g., certificate server 110) or by devices in a client/server relationship (e.g., certificate server 110 and one or more clients). Furthermore, it should be noted that the devices or elements described below may not be mandatory and thus some may be omitted in certain embodiments.

Certificate server 110 may include or otherwise be in communication with processing circuitry 202 that is configured to perform data processing, application execution and other processing and management services according to some exemplary embodiments of the present invention. Processing circuitry 202 may include processor 204, and storage device 206. Processing circuitry 202 may be in communication with or otherwise configured to control user interface 208 and device interface 210. As such, processing circuitry 202 may be embodied as a circuit chip (e.g., an integrated circuit chip) configured (e.g., with hardware, software or a combination of hardware and software) to perform operations described herein. However, in some embodiments, processing circuitry 202 may be embodied as a portion of a laptop computer, workstation, mobile telephone, or other type of computing device(s). In situations where processing circuitry 202 is embodied as a server or at a remotely located computing device, user interface 208 may be disposed at another device (e.g., at a computer terminal or client device such as user device 102) that may be in communication with processing circuitry 202 via device interface 210 and/or a network (e.g., network 108).

User interface 208 may be in communication with processing circuitry 202 to receive an indication of a user input at user interface 208 and/or to provide an audible, visual, mechanical or other output to user 212. As such, user interface 208 may include, for example, a keyboard, a mouse, a joystick, a display, a touch screen, a microphone, a speaker, a cell phone, and/or one or more other input/output mechanisms. In exemplary embodiments, user interface 208 may include interface options for changing parameters and other configurations of certificate server 110.

Device interface 210 may include one or more interface mechanisms for enabling communication with other devices and/or networks. In some embodiments, device interface 210 may comprise any means embodied in hardware, software, or a combination of hardware and software that is configured to receive and/or transmit data from/to a network and/or any other device or module in communication with processing circuitry 202. In this regard, device interface 210 may include, for example, an antenna (or multiple antennas) and supporting hardware (e.g., circuitry) and/or software for enabling communications with a wireless communication network and/or a communication modem or other hardware/software for supporting communication via cable, digital subscriber line (DSL), universal serial bus (USB), Ethernet and/or other means for communication. In situations where device interface 210 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an exemplary embodiment, storage device 206 may include one or more tangible, non-transitory memory devices such as, for example, volatile and/or non-volatile memory that may be either fixed or removable. Storage device 206 may be configured to store information, data, applications, instructions or the like for enabling certificate server 110 to carry out various functions in accordance with exemplary embodiments of the present invention. For example, storage device 206 can be configured to buffer input data for processing by processor 204. Additionally or alternatively, storage device 206 could be configured to store instructions for execution by processor 204, such as those discussed in connection with FIGS. 4A-4C. As yet another example, processor 204 may store data in database 114, as well as a variety of files, contents, and/or data sets (including encrypted/decrypted secret messages associated with domain names and/or public keys), among other things. The contents of storage device 206 and/or database 114 may include applications (e.g., server provisioning applications and/or other types of service applications) that are stored for execution by processor 204 to carry out functionality associated with each respective application.

Processor 204 may be embodied in a number of different ways. For example, processor 204 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an exemplary embodiment, processor 204 may be configured to execute instructions, such as those discussed in connection with FIGS. 4A-4C, stored in storage device 206 or otherwise accessible to processor 204. As such, whether configured by hardware or software methods, or by a combination thereof, processor 204 may represent an entity (e.g., physically embodied in circuitry) capable of performing operations according to embodiments of the present invention while configured accordingly. Thus, for example, when processor 204 is embodied as an ASIC, FPGA or the like, processor 204 may be specifically configured hardware for conducting the operations described herein, including those discussed in connection with FIGS. 4A-4C. Alternatively, as another example, when processor 204 is embodied as an executor of software instructions, the instructions may specifically configure processor 204 to perform the operations described herein.

In some embodiments, processor 204 (or processing circuitry 202) may be embodied as, include or otherwise control email generator 214 and/or certificate generator 216. Email generator 214 and/or certificate generator 216 may each include any suitable means, such as a device or circuitry operating in accordance with software or otherwise embodied in hardware or a combination of hardware and software (e.g., processor 204 operating under software control, the processor 204 embodied as an ASIC or FPGA specifically configured to perform the operations described herein, or a combination thereof) thereby configuring the device or circuitry to perform the corresponding functions of email generator 214 and/or certificate generator 216, respectively, as described below.

Email generator 214 may be configured to enable the generation of an email to a random email address that includes an encrypted secret message. The random email address may be generated by random email address generator 218 and the secret message may be generated by secret message generator 220. In some embodiments, email generator 214 (or processor 204 or processing circuitry 202, among others) may be embodied as, include or otherwise control random email address generator 218 and/or secret message generator 220. Random email address generator 218 and/or secret message generator 220 may each be any means such as a device or circuitry operating in accordance with software or otherwise embodied in hardware or a combination of hardware and software, thereby configuring the device or circuitry to perform the corresponding functions of random email address generator 218 and secret message generator 220, respectively, as described below.

In some embodiments, random email address generator 214 can generate an email address that is formatted as shown in FIG. 3. Prefix 302 can be included in each email address generated by random email address generator 214. An appliance, such as appliance 104, or other type of device can be configured to identify email addresses that include prefix 302 and determine that the email address includes a secret message. Prefix 302 can be consistent and, in some embodiments, identical, among more than one randomly generated email address. For example, each email address generated by random email address generator 214 can include a three-letter string of symbols, such as "ZPN." However, other predefined strings of symbols may be generated in other embodiments.

In other embodiments, random email address generator 214 can be configured to generate a secret message identifier, which may include one or more differing strings of one or more characters, in a predetermined position or positions, that indicate to a remote device that a secret message is included in the email message. For example, prefix 302 can be the for every random email address generated. As another example, prefix 302 may be the same for the same types of email messages, but differ among some types of email messages being generated. As yet another example, all email messages addressed to a first domain and/or appliance can have a similar or the same prefix 302, while email messages being sent to other domains and/or appliances can have a different prefix 302. Additionally, in some instances, a common set of symbols included in an otherwise randomly generated email address can be associated with other common characteristics of the message, such as the sender of the message, the intended recipient, and/or other aspects of the process and systems being used.

Prefix 302 is shown in FIG. 3 as a string of three uppercase letters at the beginning of the generated email address. In some embodiments, prefix 302 can include more or less symbols (alphanumeric or otherwise) and/or be located at different places within the generated email address (e.g., after random portion 304, within random portion 304, elsewhere within the generated email address, or combination thereof). Also, in some embodiments (not shown), more than one common set of characters can be included in a random email address generated by random email address generator 214. For example, instead of or in addition to prefix 302, a suffix, comprising one or more characters (not shown), can be included after random portion 304 and before symbol 306 to provide the same identification functionality discussed herein in connection with prefix 302, such that the appliance is alerted to the presence of a secret message and knows what to expect and/or look for. As another example, prefix 302's symbols can be distributed throughout random portion 304 in predefined manner (e.g., "Z" being after the second random symbol, "P" being after the fifth symbol, and "N" being after the eighth random symbol, An appliance or other remote device can then be preconfigured to parse the destination email address of each incoming email message, look for prefix 302 (at the position it is supposed to be located within the randomly generated email address), and determine whether the destination email address includes one or more predetermined characters in one or more predetermined locations, thereby indicating there is a secret message in the body of the email message.

While the body of the email message, as referred to herein, includes the payload portion of the email message comprising data to be transformed into user-readable information, in some other embodiments, the body of the email or other type of electronic message may similarly be the payload portion (as opposed to, e.g., the routing portion) of the message that includes the data to be presented to the user. For example, in some electronic messaging systems, the routing devices may be preconfigured to ignore the body of at least some messages, unless prefix 302 (and/or other type of secret message identifier) is included in the routing portion of the message and is recognized by at least one of the routing devices (such as the appliance 104). For example, the body of a VoIP message may include the portion of the message dedicated to carrying data representing the audio signal being transported.

In addition to or instead of parsing the destination email address for a secret message identifier (such as, e.g., prefix 302 and/or other nonrandom character(s) in a predetermined position of the otherwise random destination email address), one or more remote devices can also be configured to parse other data to determine whether the email message may or may not include a secret message to be decrypted. For example, a remote device can be preconfigured to parse other aspects of the routing information (e.g., one or more origination email addresses, metadata associated with the email, etc.), the electronic message's payload data (e.g., the body of the email, payload metadata, etc.), and/or any other information (such as data independent from and/or external to the electronic message, which may include data posted to a blog or other website, etc.). By parsing one or more other fields in addition to or instead of the destination email address, a greater level of security (due to the potential of alternative embodiments), speed, and/or efficiency may be realized.

Random email address generator 218 can also be configured to generate a random set of symbols to be used as at least part of a destination email address. The random set of symbols can be included in, for example, random portion 304. The random set of symbols can comprise, e.g., a cryptographically random set of alphanumeric characters, such as ten alphanumeric characters shown in FIG. 3. In some embodiments, random email address generator 218 can be configured to select and/or generate symbols independent of time. In other embodiments, random email address generator 218 can generate random symbols using a time dependent protocol, or a combination of time dependent and time independent protocols (e.g., some symbols being time dependent and others time independent). The symbols can be, for example, Base64, Base128, Base256, or based on any other suitable computer readable encoding scheme (such as, e.g., those consistent with the current remote serial communications, "RSC", system).

Domain portion 308 of the destination email address can be generated based on, for example, an identification of an email domain that random email address generator 218 receives. For example, email server 112 and/or other remote device can transmit an email message to certificate server 110. Processing circuitry 202, random email address generator 218 and/or any other component of certificate server 110 can determine the domain name based on the email address of the previously received email message by, for example, analyzing the information following after the "@" symbol of the sender's email address.

While the domain of the email message, as referred to herein, can be used to route an email message to a destination appliance, other types of "domains" can be used to route other types of electronic messages. In this regard, as referred to herein in relation to some embodiments, a message's "domain" can generically refer to routing information, or at least a portion thereof, that can be mapped to one or more appliances used to provide encryption services for electronic messages.

In addition to or instead of determining the domain name from an incoming email message, the domain portion 308 can be generated from one or more other types of electronic messages using one or more types of protocols, such as, for example, the file transfer protocol ("FTP"), hypertext transfer protocol ("HTTP"), transmission control protocol/internet protocol ("TCP/IP"), SMS, and/or any other type of protocol or means for delivering a message. For example, processing circuitry 202 can be configured to receive a text message that identifies a domain name to be used in generating a random email address for the purpose of validating an appliance before providing encryption provisioning of the appliance.

Returning to FIG. 2, email generator 214 may also include secret message generator 220. In some embodiments, secret message generator 220 can be configured to compile a secret message to be emailed to the email address created by random email address generator 218. The secret message can comprise one or more symbols. For example, the unencrypted secret message can comprise one or more tokens, a string of one or more random symbols, and/or human-readable set of information (e.g., word, phrase, sentence, etc.). In some embodiments, the secret message can include two or more positive integers, provided by the Java Class SecureRandom, that are concatenated together. In other embodiments, some or the entire secret message may be retrieved from database 114 and/or other storage device, rather than or in addition to being independently generated by secret message generator 220.

Secret message generator 220 may also be configured to encrypt the secret message generated, retrieved, or otherwise compiled by secret message generator 220. For example, secret message generator 220 may also be configured to encrypt the secret message using a public key generated at least in part by and/or received from, for example, an appliance (such as appliance 104), a user device (such as user device 102), and/or any other network device. The public key used by secret message generator 220 may be retrieved from a database, such as database 114. In database 114, the public key may be associated with, for example, one or more domain names, user devices, user identifying information (e.g., username and password), time stamps, expiration dates, and/or any other available data.

Secret message generator 220 may also be configured to process the encrypted and/or unencrypted secret message for storage. For example, rather than store the secret message, the secret message can be inputted into a hash function and the output of the hash function, sometimes referred to herein as the "hash value," can instead be stored in a database, such as database 114. The hash value and/or other data derived from the secret message may then be linked to other data (such as the public key and/or domain name) associated with the secret message.

Certificate server 110 may also include certificate generator 216, which can enable certificate server 110 to provision a remote device, such as appliance 104, to provide security services for one or more email domains. For example, certificate generator 216 can generate an electronic certificate that is issued to an appliance in response to the appliance successfully decrypting and returning a secret message. The appliance may be configured to decrypt and return the secret message in response to recognizing (as subsequently described in connection with FIG. 3 and step 440 of FIG. 4) a random email address that was generated by email generator 214. Certificate generator 216 can also be configured to initiate the preparation and equipping of a network appliance or other device to allow certificate server 110 to provide new and/or enhanced services, security or otherwise, to by the network appliance.

In other embodiments, in addition to or instead of certificate generator 216 being implemented by certificate server 110, a certificate generator may be implemented by a user device, such as user device 102. The user device can be configured to generate a certificate that includes and/or references the public key and/or domain name to be provisioned, and transmit the certificate to certificate server 110. For example, the user device can transmit the certificate to certificate server 110 with the public key. Certificate server 110 can then be configured to receive the certificate from the user device, store the certificate (in, e.g., database 114 and/or elsewhere), distribute the certificate to an appliance (such as, e.g., appliance 104), activate the certificate (such that, e.g., other network devices may benefit from the certificate), and/or perform any other action with or to the certificate generated by a user device. Some examples of other actions that may be performed with or to a certificate generated by a user device are discussed herein in connection with certificates generated by certificate server 110.

Processing circuitry 202, processor 204, email generator 214, certificate generator 216, and/or any other circuitry that may be incorporated into one or more apparatuses in accordance with some embodiments discussed herein, may operate under control of a computer program product and be used to control mechanical components and/or exchange transitory signals containing data. For example, a computer program product can be implemented on a computer-readable storage medium, such as storage device 206.

As will be appreciated, any such computer program instructions may be loaded onto a computer or other programmable apparatus, e.g., processor 204, to produce a machine, such that the instructions which execute on the computer or other programmable apparatus create means for implementing the functions described herein. These computer program instructions may also be stored in a computer-readable memory that may cause a computer or other programmable apparatus to be configured to function in a particular manner, such that the instructions stored in the computer-readable memory produce an article of manufacture including instruction means to implement the functions described herein. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions described herein.

FIGS. 4A-4C show exemplary methods for executing instructions that may be used to provision an appliance to provide services, such as email security related services, in accordance with some embodiments discussed herein. FIG. 4A shows process 400 that starts at 402.

At 404, a user device, such as user device 102, can be configured to execute instructions for generating a public key and private key pair as well as a certificate. The instructions may have been previously stored on the user device and/or downloaded from a network device. The public key and private key pair can be generated using, for example, the RSA algorithm comprising a three thousand bit string. In other embodiments, any other suitable bit string and/or algorithm may used. Also, in some other embodiments, a device other than or in addition to user device 102 can be configured to execute instructions for generating the public, private key pair, certificate and/or other security tools used in process 400.

At 406, the user device and/or other device can be configured to send the public key and/or private key to an appliance, such as appliance 104, associated with an email domain the user device can access email messages addressed thereto. For example, user device may be able to access emails, stored locally and/or remotely, that are addressed to the domain named "zix.com" and, at 406, the user device may provide the public/private key pair, or just the private key, to an appliance that serves the zix.com domain. In some embodiments, at least the private key can be communicated to the appliance over a secure communications path.

At 408 a determination is made as to whether or not the private key and/or public key were successfully sent to the appliance. The user device, the appliance, and/or other device(s) can be configured to make the determination at 408. For example, the user device can be configured to generate a confirmation indicating that the user device successfully sent the public and/or private key to the appliance. As another example, the appliance can also or instead generate a confirmation that the public key and/or private key have been successfully received by the appliance. In response to determining at 408 that the public key and/or private key have yet to be successfully pushed to the appliance, the user device may wait at 410 for the confirmation of a successful push to the appliance. Process 400 then returns to 408.

In some embodiments, rather than returning to 408, process 400 can proceed to 406 and attempt to resend the public key and/or private key to the appliance. In yet other embodiments, rather than return to 408 or 406, process 400 can return to 404, a new public key and/or private key can be generated and pushed to the appliance at 408. After executing 404, 406 and/or 408 a predetermined number of times (e.g., 5, 10, or any other number), process 400 can end and the system can indicate that an error occurred in pushing the public key and/or private key to the appliance.

In response to determining at 408 that the public key and/or private key have been successfully provided to the appliance, process 400 proceeds to 412. The user device can be configured to execute instructions for sending a certificate server, such as certificate server 110, the public key generated at 404 and a domain name of an email service the user device can access (with or without user-entered information). In some embodiments, the user device can also send a certificate to the certificate server. The certificate may include and/or otherwise be associated with the public key and/or domain name. In other embodiments, an appliance and/or other device can also or instead be configured to send the certificate, public key and/or the domain name to a certificate server. In some embodiments, the user device can send the certificate, public key and/or domain name over a public and/or private network using any suitable protocol and/or messaging system.

At 414, the certificate server can store the certificate, public key and/or domain name in a database and/or other storage device. For example, the certificate server can map the certificate and/or public key to at least one domain name in a multi-dimensional data array that uses pointers, joins and/or other type(s) of data linking mechanisms.

At 416, the certificate server can be configured to execute instructions for generating a message using, among other things, the public key received at 414 to encrypt the message. For example, as discussed in connection with FIG. 2, the secret message can be an encrypted token comprising two positive secure random long integers that are concatenated together and encrypted using the public key generated by a user device. The encryption process can be at least partially performed by the certificate server and can be specific to the domain name received at 414.

At 418, the certificate sever can be configured to execute instructions for storing the secret message (as encrypted and/or as unencrypted) with the public key and/or domain name. For example, the message can be linked to the public key and/or domain name for future reference. In some embodiments, rather than or in addition to storing the secret message, data derived from the secret message may be stored. For example, the unencrypted secret message may be inputted into a hash function (such as, e.g., the Message-Digest algorithm 5, or "MD5") and the outputted hash value may be stored and/or linked to the public key and/or domain name for future reference. As such, in some embodiments, the secret message (encrypted or unencrypted) may never be stored by the certificate server and/or other device.

Process 400 continues in FIG. 4B. The certificate server can be configured to execute instructions at 420 for generating a random sequence of symbols. The random sequence of symbols can be used by the certificate server to generate a random email address as described above and as shown at 422. The domain name received at 414 and/or nonrandom symbols can also be used to generate the email address at 422. At 424, the certificate server can be configured to insert the encrypted secret message into the body of the email message addressed to the random email address generated at 422.

The generated email message can then be provided at 426 to an outgoing email server, such as email server 112. At 428, the email server sends the email message to the random email address using, for example, DNS resources.

At 430, in response to the appliance not receiving the email message, the certificate server can wait at 432 to receive a decrypted secret message. However, since the appliance did not receive the email message, the appliance does not generate and send a decrypted secret message. At 434, a determination is made as to whether or not the certificate server has timed out waiting to receive the decrypted message. In response to determining that the system has timed out, process 400 ends at 436.

In response to determining that the system has not timed out at 434, the certificate server can be configured in some embodiments to execute a resending protocol at 438. The resending protocol executed at 438 can be optional (like other functionality discussed herein) and can include instructions for resending the encrypted secret message to the random email address one or more times over a given period of time before the certificate server determines it has timed out. For example, the certificate server can resend the generated email message every fifteen minutes for two hours, without receiving a response or other indication that the appliance has received the email, before timing out. In some embodiments, the resend protocol of 438 can be executed in response to receiving a delivery failure notification, rather than or in addition to waiting for the decrypted secret message to be received at 432.

In response to the appliance receiving the generated email message at 430, the appliance can determine at 440 whether or not the email message contains a secret message. The determination at 440 can be based on, for example, the appliance executing instructions (which may have been previously provided to the appliance by the certificate server) for parsing the destination, randomly generated email address for a prefix and/or other nonrandom, predetermined symbols (such as prefix 302 discussed above) that are indicative of the email message containing a secret message. At 442, the appliance can attempt to locate a private key to decrypt the secret message. In response to determining at 442 that the appliance does not have access to the appropriate private key, process 400 returns to 432. In response to determining at 442 that the appliance does have the appropriate private key, process 400 proceeds to 444 shown in FIG. 4C.

At 444, the appliance uses the private key accessed at 442 to decrypt the secret message. At 446, the appliance can send the decrypted message to the certificate server. The decrypted message can be sent using any suitable protocol and/or by any suitable messaging means (including SMS, email messaging, automatic web posting and retrieval, among others).

At 448, the certificate server receives and processes the decrypted secret message sent by the appliance. For example, the certificate server may execute a hash function using the received message as an input to the hash function. At 450, the certificate server can then access the database and/or other storage device in which the secret message or processed version thereof was stored at 418. The secret message and/or derived data (such as a hash value derived from the secret message), which may be stored as encrypted and/or decrypted, can be retrieved at 450 using, e.g., the domain name, time stamp, and/or by any other means.

At 452, a determination is made by the certificate server as to whether or not the secret message and/or derived data retrieved from the database matches (e.g., is the same as or is sufficiently similar to) the decrypted secret message received from the appliance. In response to determining at 452 that the secret messages match the certificate server can be configured to execute instructions at 454 for activating and issuing a certificate and/or to otherwise provision the appliance to provide one or more specific services. For example, the appliance can be automatically provisioned (e.g., without user intervention or involvement at least since 404) to provide email encryption services for a particular email domain. In some embodiments, such as those where a user device has not generated the certificate, properly transmitted the certificate to the certificate server at 412 (due to, e.g., a transmission error, or not being configured to do so) and/or the certificate server has not properly stored the certificate at 418, the certificate server can be configured to generate the certificate at 454.

At 456, an indication that the certificate was activated and/or issued can be saved to a database and/or other storage device. In embodiments where the certificate was generated at 454, the certificate can also be stored at 456 to a database and/or other storage device. The indication saved to the database can indicate, for example, the appliance has been provisioned to provide security services, including email encryption services, for a particular domain. The certificate server can be configured to ignore future requests to provision appliances and/or other devices for the particular domain.

At 458, the application can implement the provisioned services. For example, the appliance can automatically encrypt and decrypt at least some email messages that are addressed to or from email addresses at the domain. Process 400 can then end at 460.

In response to determining at 452 that the secret message received by the certificate server does not match and is different than the secret message stored in the database and/or other storage device, the certificate server may be configured to not provision the appliance to provide services for the domain. At 462, the domain may remain available for provisioning by the certificate server.

At 464, the domain administrator may also be notified of an attempted security breach. For example, the domain administrator may be notified via email or otherwise that an unauthorized party attempted to cause some or all email messages addressed to or from the domain to be encrypted. The notification sent at 464 can include provisioning services to the appliance to help prevent future attacks. The provisioning services may be provided for a fee (e.g., a subscription fee, upfront fee, trial period, and/or any other type of fee structure) or for free (temporarily or permanently). After such period of time, the certificate server can be configured to cancel the provisioning services, the certificate may expire, and a license agreement may be violated, among other things. Process 400 may then end at 466, or if the offer is accepted by the domain administrator start at 402.

Many modifications and other embodiments of the inventions set forth herein will come to mind to one skilled in the art to which these inventions pertain having the benefit of the teachings presented in the foregoing descriptions and the associated drawings. For example, while the discussion herein often references examples based on email messaging systems, similar protocols and/or systems may be used for provisioning an appliance for encrypting/decrypting VOIP, SMS, IM, and other types of communication systems. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of provisioning security services for a domain or set of domains, the method comprising:
   sending an electronic message to the domain or set of domains, the electronic message comprising a secret message, the secret message encrypted using a public key that a certificate server associates with the domain or set of domains;
   receiving a response from the domain or set of domains, the response comprising data derived by decrypting the secret message using a private key of the domain or set of domains; and
   determining whether the received data corresponds to the secret message sent in the electronic message, wherein:
      in response to determining that the received data corresponds to the secret message sent in the electronic message, the method further comprises automatically initiating the provisioning of the security services for the domain or set of domains, wherein the provisioning of the security services comprises activating and/or issuing a certificate for the domain or set of domains to provide encryption services; and
      in response to determining that the received data does not correspond to the secret message sent in the electronic message, the method further comprises notifying a domain or set of domains administrator and not initiating the provisioning of the security services.

2. The method of claim 1, wherein the data derived by decrypting the secret message comprises the decrypted secret message.

3. The method of claim 1, wherein the data derived by decrypting the secret message comprises a hash value determined from the decrypted secret message.

4. The method of claim 1, wherein the domain or set of domains comprises an appliance to which the electronic message is sent.

5. The method of claim 4, wherein the electronic message is sent to the appliance in response to receiving the public key from a device other than the appliance to which the electronic message is sent.

6. A system comprising one or more processors and one or more non-transitory computer-readable storage media having stored therein instructions that, when executed by the one or more processors, cause the system to:
   send an electronic message from a certificate server, the electronic message sent to an appliance associated with a domain or set of domains, the electronic message comprising a secret message, the secret message encrypted using a public key that a certificate server associates with the domain or set of domains;
   receive a response at the certificate server, the response received from the appliance associated with the domain or set of domains, the response comprising data derived by decrypting the secret message using a private key of the domain or set of domains; and
   determine, by the certificate server, whether the received data corresponds to the secret message sent in the electronic message, wherein:
      in response to a determination that the received data corresponds to the secret message sent in the electronic message, the certificate server automatically initiates the provisioning of security services for the domain or set of domain, wherein the provisioning of the security services comprises activating and/or issuing a certificate for the domain or set of domains to provide encryption services; and
      in response to a determination that the received data does not correspond to the secret message sent in the electronic message, the certificate server notifies a domain or set of domains administrator and does not initiate the provisioning of the security services.

7. The system of claim 6, wherein the data derived by decrypting the secret message comprises the decrypted secret message.

8. The system of claim 6, wherein the data derived by decrypting the secret message comprises a hash value determined from the decrypted secret message.

9. The system of claim 6, wherein the certificate server sends the electronic message to the appliance via a mail server and receives the response from the appliance via the mail server.

10. The system of claim 6, wherein the system comprises the certificate server, the domain or set of domains comprises an appliance, the electronic message is sent from the certificate server to the appliance, the data derived by decrypting the secret message is received from the appliance by the certificate server, and the provisioning provisions the appliance.

11. The system of claim 10, wherein the electronic message is sent in response to the one or more processors receiving the public key from a device other than the appliance to which the electronic message is sent.

12. A method of provisioning security services for a domain or set of domains, the method comprising:
   receiving an electronic message at the domain or set of domains, the electronic message comprising a secret message, the secret message encrypted using a public key that a certificate server associates with the domain or set of domains;

determining that the electronic message includes a predetermined set of symbols, the predetermined set of symbols indicating the presence of the secret message;

decrypting the secret message using a private key of the domain or set of domains;

sending a response from the domain or set of domains, the response comprising data derived by decrypting the secret message using the private key of the domain or set of domains;

determining whether the data derived by decrypting the secret message corresponds to the secret message received in the electronic message based on whether provisioning has been received, wherein:

in response to receiving the provisioning, the method further comprises provisioning the security services for the domain or set of domains based on the received provisioning, wherein the provisioning comprises providing encryption services based on a certificate activated and/or issued for the domain or set of domains; and in response to not receiving the provisioning, the method further comprises notifying a domain or set of domains administrator and not initiating the provisioning of the security services.

13. The method of claim 12, wherein the data derived by decrypting the secret message comprises the decrypted secret message.

14. The method of claim 12, wherein the data derived by decrypting the secret message comprises a hash value determined from the decrypted secret message.

15. A system comprising one or more processors, the one or more processors associated with a domain or set of domains, and one or more non-transitory computer-readable storage media having stored therein instructions that, when executed by the one or more processors, cause the system to:

receive an electronic message at an appliance associated with the domain or set of domains, the electronic message received from a certificate server, the electronic message comprising a secret message, the secret message encrypted using a public key that the certificate server associates with the domain or set of domains;

determine, by the appliance, that the electronic message includes a predetermined set of symbols, the predetermined set of symbols indicating the presence of the secret message;

decrypt, by the appliance, the secret message using a private key of the domain or set of domains;

send a response from the appliance associated with the domain or set of domains, the response sent to the certificate server, the response comprising data derived by decrypting the secret message using a private key of the domain or set of domains;

determine, by the appliance, whether the data derived by decrypting the secret message corresponds to the secret message received in the electronic message, the determination based on whether the appliance has received provisioning from the certificate server, wherein:

in response to receiving the provisioning from the certificate server, the appliance provisions the security services for the domain or set of domains based on the received provisioning, wherein the provisioning comprises providing encryption services based on a certificate activated and/or issued for the domain or set of domains; and in response to not receiving the provisioning from the certificate server, the appliance notifies a domain or set of domains administrator and does not initiate the provisioning of the security services.

16. The system of claim 15, wherein the data derived by decrypting the secret message comprises the decrypted secret message.

17. The system of claim 15, wherein the data derived by decrypting the secret message comprises a hash value determined from the decrypted secret message.

18. The system of claim 15, wherein the appliance receives the electronic message from the certificate server via a mail server and sends the response to the certificate server via the mail server.

* * * * *